Oct. 1, 1963     S. KUETHER     3,105,650
SPINNING REEL

Original Filed Nov. 30, 1959     4 Sheets-Sheet 1

Inventor
Siegfried Kuether
By Stevens, Davis, Miller & Mosher
Attorneys

Inventor
Siegfried Kuether
By Stevens, Davis, Miller & Mosher
Attorneys 3,105,650
SPINNING REEL
Siegfried Kucther, % Tamco Limited, Gladstone Ave., La Salle, Ontario, Canada
Original application Nov. 30, 1959, Ser. No. 856,196. Divided and this application Nov. 29, 1960, Ser. No. 79,100
Claims priority, application Canada Dec. 1, 1958
3 Claims. (Cl. 242—84.2)

My invention relates to spinning reels designed for use with fishing rods. This is a divisional application of application Serial No. 856,196, filed November 30, 1959, and now abandoned.

My new spinning reel is selectively effective at all times by push buttons which function to automatically control the operation of the spinning reel at any critical moment when the reel is in use.

An object of my invention is to provide an improved form of line pickup which is fully automatic and noiseless in operation.

Other objects of my invention will be made clear as the specification develops.

In accordance with this invention there is provided a spinning reel comprising a casing; a non-rotatable sleeve in the casing; a spool rigidly mounted on the sleeve; a shaft journalled in the sleeve and formed with a bore in one end; a reel disc mounted on the shaft in parallel spaced relation to the spool, said reel disc having a flanged peripheral wall extending inwardly into the casing; means for securing the reel disc to the shaft; a pair of parallel guide ribs on the inner face of the reel disc, said guide ribs disposed equi-distantly on opposite sides of the axis of said reel disc; a cam slide slidably mounted between said guide ribs, said cam slide formed with a central opening having a portion thereof bevelled rearwardly to form an inclined arcuate face; a pickup pin extending from an end wall of said cam slide and normally projecting beyond the peripheral wall of said reel disc; a spindle slidably mounted in the bore of said shaft; a frusto-conical cam member mounted on said spindle and movable therewith longitudinally of said bore, said cam member adapted to engage the inclined arcuate face of said cam slide upon longitudinal movement of said spindle in said bore thereby to move said cam slide inwardly between said guide ribs diametrically across the inner face of said reel disc to retract the pickup pin; means for automatically moving the cam slide to return the pickup pin to its normal projected position upon rotation of said shaft, said means consisting of a recess formed in the inner wall of said spool, the inner peripheral wall of said recess forming a cam race and having an inwardly disposed cam projection, and a pin projecting rearwardly from said cam slide at the end thereof opposite to said pickup pin, said pin adapted upon rotation of said shaft to engage said cam projection and move the cam slide outwardly through the guide ribs thereby to project the pickup pin beyond the periphery of the reel disc; means for transmitting rotary motion to the shaft; and means controlling the direction of rotation of the said transmitting means.

So that the nature of my invention may be clearly understood I have illustrated an embodiment of the same which I shall describe in detail, but I wish it to be understood that I do not limit my invention to this specific form illustrated and described, but reserve the right to modify the several parts of my invention within the scope of my appended claims.

In the drawings.

Like characters of reference refer to like parts in the several figures of the drawings.

Figure 1:
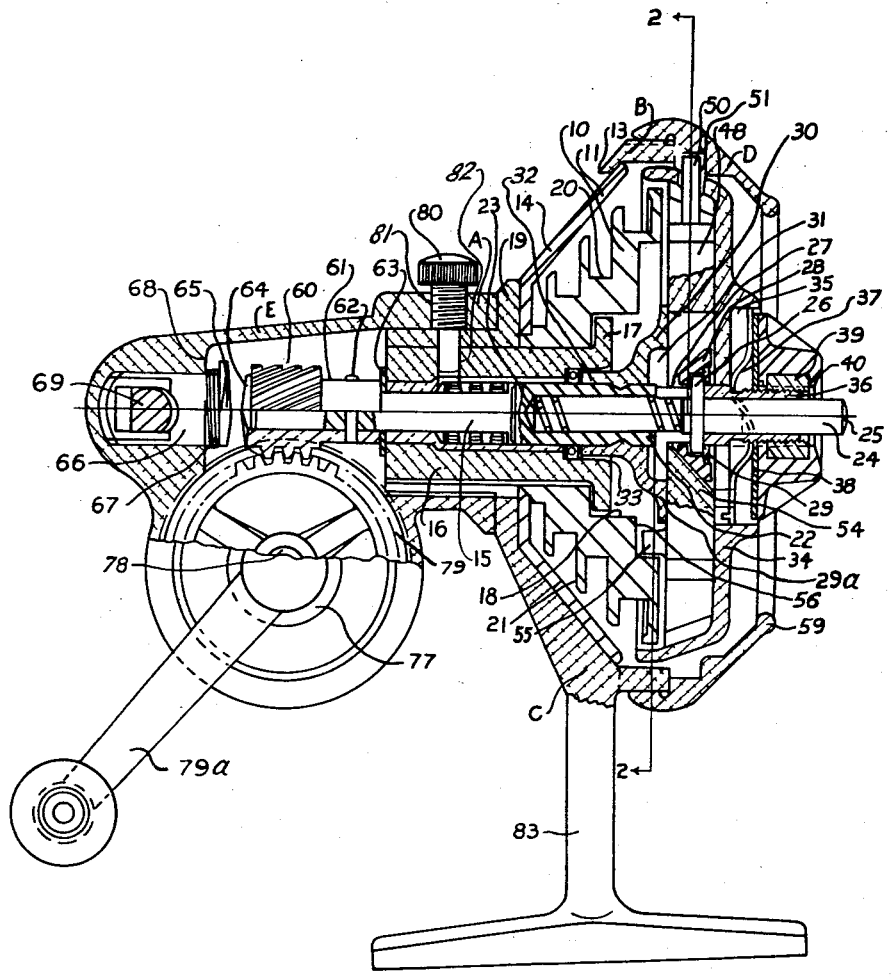
FIGURE 1 is an elevation of my spinning reel showing the main or body portion in section.
Figure 2:
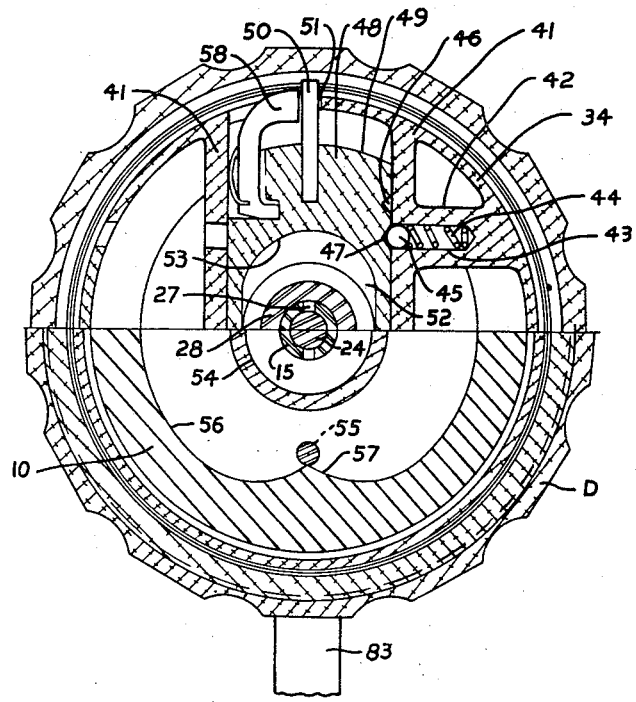
FIGURE 2 is a transverse section on the line 2—2 of FIGURE 1, looking in the direction of the arrows.
Figure 4:
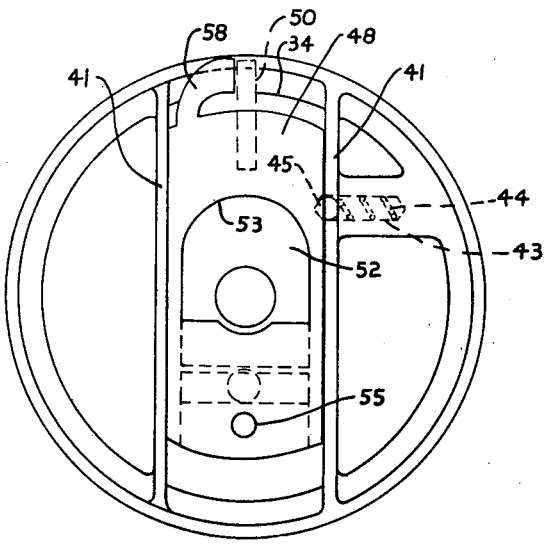
FIGURE 4 is a view of the rear wall of the rotatable reel disc showing the manner in which the cam slide is mounted thereon.
Figure 3:
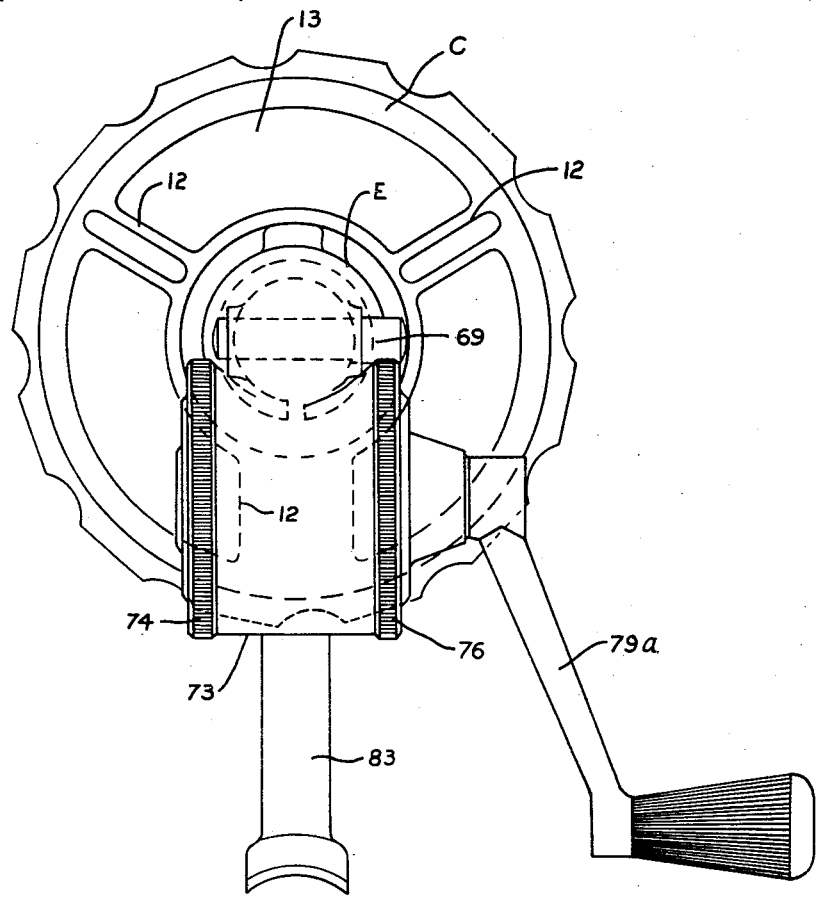
FIGURE 3 is a view of the spinning reel showing the windows in the rear wall of the casing.

Referring to the drawings, A represents my spinning reel comprising a casing B in which the spool 10 is mounted, the casing being divided into a main body portion C having a removable front annular retaining ring D, and a rearwardly extending thimble E which is removably attached to the rear end of the main body portion.

The main body portion C simulates a horizontally disposed frusto conical skeleton member 11 formed with a plurality of equidistantly spaced diverging ribs 12, so forming a plurality of similar openings or windows 13, and an inner frusto conical liner 14 of transparent material cupped within the member 11 and rigidly secured thereto.

The shaft 15 is journalled in a bushed sleeve 16 formed on one end with an integral radially extending flange 17 which projects into a recess 18 in the front wall of the spool 10. The hub of the spool 10 is located between the flange 17 and the rear wall 19 of the main body portion C of the casing B, and the spool 10 is firmly pressed on the sleeve and is held in a non-rotatable position. The rear wall of the spool 10 is conical and stepped as shown at 20.

By reference to FIGURE 1 it will be seen that the stepped portions of the spool 10 are each formed with a radial flange 21 so forming a plurality of concentrically arranged channels which progressively increase in diameter from the hub to the periphery of the spool.

The front end of the shaft 15 is formed with a central bore 22 in which a coil spring 23 is housed, and co-acting with the outer end of this spring is a spindle 24 which is slidably mounted in the bore of the shaft. The end of the spindle 24 projects forwardly and forms a push button 25, for an object which will be made clear hereafter.

The spindle 24 is designed to be reciprocated in the bore 22 of the shaft 15, and this movement is limited by a pin 26 which extends transversely through the spindle 24, and the projecting ends of the pin slidably engage a pair of slots 27 arranged diametrically opposite each other and extending through the peripheral wall of the bore 22 in the shaft 15.

Slidably mounted on the shaft 15 is a frusto conical cam 28 which engages the projecting ends of the pin 26 and is held in contact therewith by the washer 29 which frictionally engages a recess in the front face of the cam 28. The cam 28 rotates with the shaft 15 and the spindle 24 is normally movable inwardly into the bore 22 of the shaft 15, consequently longitudinal movement is likewise transmitted to the conical cam 28. The spindle 24 is normally spring pressed outwardly into a position limited by the engagement of the pin 26 with the outer ends of the slots 27.

Intermediate of the length of the shaft 15 a hub 29$^a$ is secured which carries an integral flange 30 formed with a central recess 31 into which the rear or smaller end of the conical cam 28 projects when the cam is moved longitudinally along the shaft 15 by movement of the spindle 24 inwardly when pressure is applied to the push button end 25 of the spindle.

The hub 29ᵃ is formed with a rearwardly extending integral sleeve 32 which projects into an annular recess 33 of the flanged end 17 of the sleeve 16. The hub 29ᵃ and its integral sleeve 32 are firmly secured to the shaft 15 and rotate therewith.

A reel disc 34 is mounted on the shaft 15 and is formed on its outer face with a flanged recess 35, and that part of the shaft 15 which projects beyond the recess 35 is reduced, as shown at 36, and this reduced end is threaded and provided on diametrically opposite sides with flat portions.

A resilient metallic strip 37 having a marginal edge anchored to the inner face of the recess 35 by a pin, is mounted on the reduced portion of the shaft 15 and extends diametrically across the recess 35. By reference to FIGURE 1 it will be seen that the opposite end of the resilient strip 37 extends outwardly to the front end of the recess 35. By reference to FIGURE 1 it will be seen that in profile the resilient metallic strip 37 has its central portion ogee in shape.

A disc 38 is provided with a central orifice having two diametrically oppositely disposed parallel edges to engage with the flattened portions of the threaded end of the shaft, and this disc 38 engages the outer face of the offset end of the resilient metallic strip 37.

On the reduced end 36 of the shaft 15 a nut 39 is threaded and this nut is embedded in or otherwise secured to a plastic finger grip 40 which encircles the nut, and the push button end 25 of the spindle 24 extends beyond the finger grip 40. The inner face of this finger grip engages the outer face of the disc 38, so that when the finger grip is rotated and the nut 39 is tightened on the threaded end of the shaft 15, then the inner face of the finger grip engages the disc 38 and presses it into intimate engagement with the resilient metallic strip 37. This metallic strip thus forms a clutch connection between the finger grip and the reel disc 34.

The reel disc 34 is dished and the flanged peripheral portion of the disc faces inwardly into the casing B. Between the flanged edge of the disc are a pair of parallel ribs 41 equidistantly spaced on opposite sides of the central aperture in the reel disc, and one of the ribs is braced by a laterally projecting rib 42.

This rib 42 is formed with a cylindrical cavity 43 in which the spring 44 is housed, and the outer end of the spring engages a ball 45 and spring presses it outwardly to yieldingly co-act with either of the two spaced recesses 46 or 47 formed in one of the lateral walls of the cam slide 48 which is slidably mounted between the parallel ribs 41.

The end walls 49 of the cam slide 48 are arcuate, and a pickup pin 50 extends from one of the end walls and projects through an orifice 51 in the peripheral dished wall of the reel disc 34. The cam slide 48 is formed with a central opening 52 simulating an ellipse, and one end 53 of this opening is semicircular and the other end 54 is arcuate and bevelled rearwardly, so forming an inclined arcuate face with which part of the peripheral wall of the frusto conical cam 28 engages.

It will be clear that as pressure is applied to the push button end 25 of the spindle 24, then as the spindle is moved longitudinally into the bore of the shaft 15, the pin 26 will move the conical cam 28 rearwardly, and the peripheral wall of the cam being in engagement with the arcuate wall 54 of the cam slide, will move the cam slide diametrically across the inner face of the reel disc 34.

This movement of the cam slide will cause the pickup pin 50 to be retracted or drawn inwardly until the outer end of the pickup pin is flush with the outer face of the dished flange of the reel disc 34, and in this position the ball 45 engages the recess 46 to hold the cam slide anchored in its inner adjusted position.

On the rear face of the cam slide 48 and at the end remote from the pickup pin 50, a pin 55 projects rearwardly into a recess 56 in the rear wall of the spool 10, the peripheral wall of the recess forming a cam race, and this wall is formed with an inwardly disposed projection 57 which constitutes a cam.

During the rotation of the reel disc 34 the pin 55 will under certain conditions engage the cam projection 57 and so move the cam slide 48 outwardly and project the pickup pin 50 through the orifice 51, and in this position the ball 45 engages the recess 47 to return the cam slide to normal position.

The cam slide 48 also carries a spring controlled fish line brake 58 which co-acts with the pickup pin 50, thereby maintaining tension on the line between wound on the spool 10 to prevent slack line being inadvertently wound on the spool 10. The brake 58 is resiliently urged towards the projected pickup pin 50 and frictionally engages the line between it and pin 50 to maintain tension on the line. The outer rearwardly projecting peripheral wall of the annular retaining ring D makes threaded engagement with the forward end of the main body portion C of the casing B, and the forward peripheral edge 59 of the front of the ring is rounded to permit of the fishing line riding over this rounded edge without possibility of fraying the line.

The inner edge of the flanged or dished peripheral wall of the reel disc 34 overhangs the peripheral base portion of the spool 10, so that the fish line is fed by the pickup pin 50 around the back of the spool in an unimpeded path.

The shaft 15 located at the rear of the bore 22 is reduced and projects beyond the rear wall of the main body portion C of the casing B. A bronze worm 60 provided with a projecting hub 61 is mounted on the rear reduced portion of the shaft 15 and is secured thereto by a pin 62 which passes through the hub and the shaft. The end of the hub 61 abuts on a washer 63 located between the bushed sleeve 16 and the hub.

The end face of the bronze worm 60 is formed with a plurality of serrations or teeth 64 which co-act with oppositely disposed serrations or teeth 65 formed on the end of the non-rotatable stub rod 66 which is arranged in alignment with the shaft 15. This stub rod is slidably mounted in the end of the thimble E of the casing B of the reel.

The projecting end of the stub rod 66 is enlarged, and a spiral spring 67 is located between this head and a radial shoulder 68 on the interior of the thimble E.

The push button 69 which is substantially cylindrical in form is mounted in the thimble E and is adapted to be moved diametrically across the thimble to project the stub rod 66 forwardly so that the serrations or teeth 65 on the rod will engage the serrations or teeth 64 on the bronze worm 60. It will be noted that this engagement is yielding, that is to say when the shaft 15 is rotated in a clockwise direction the teeth 64 on the bronze worm 60 will overrun or ride over the teeth 65 on the stub rod.

In this position the rotation of the shaft 15 is clockwise, and it is not possible to reverse this rotation of the shaft, since the serrations or teeth 65 will engage and interlock with the teeth 64 and so prevent any anti-clockwise rotation of the shaft 15. In other words the serrations or teeth 65, and the serrations or teeth 64 co-act to form a slipping clutch, permitting a unidirectional rotation of the shaft 15 in a clockwise direction only.

Figure 5:
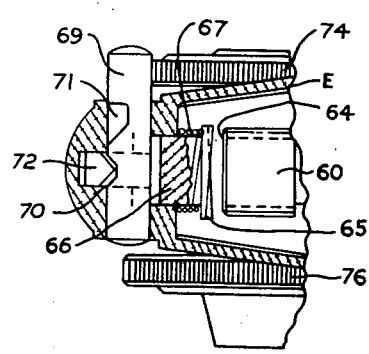
FIGURE 5 is a transverse section through the anti-reverse coupling shown in FIGURE 1.
Figure 7:
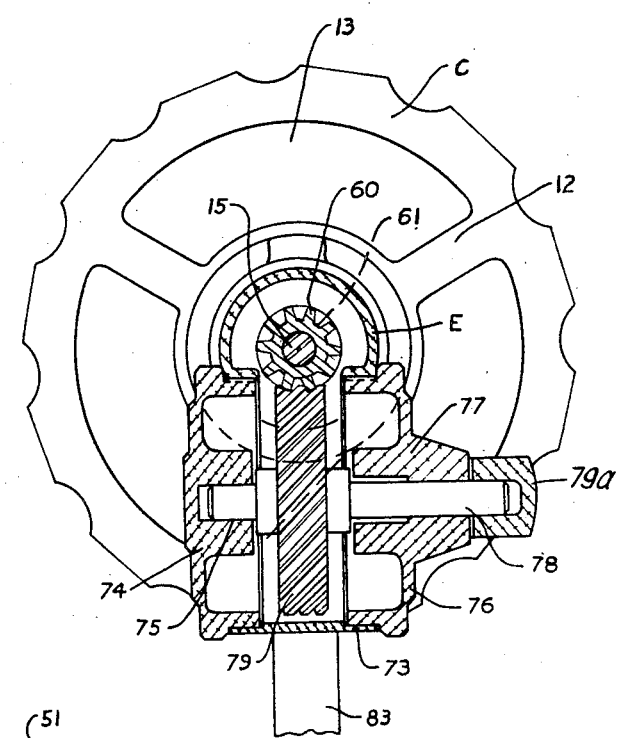
FIGURE 7 is a vertical section through the cylinder housing the worm wheel, showing the co-acting worm on the drive shaft, and also the interchangeable covers or end walls threaded into the ends of the cylinder.
Figure 6:
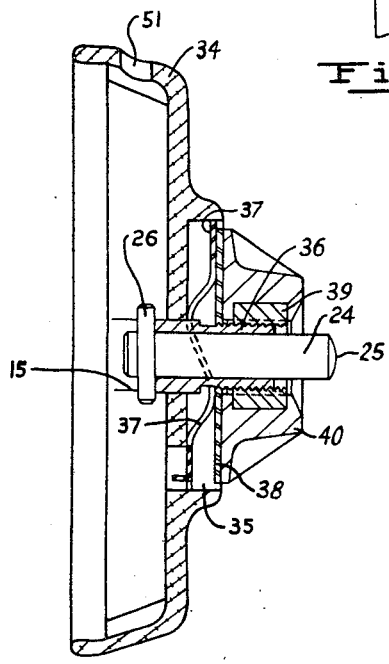
FIGURE 6 is a section through the finger grip and reel disc, showing the clutch mechanism between the finger grip and the reel disc.

The mechanism for moving the stub rod 66 longitudinally consists of the push button 69 which as shown in FIGURE 5 consists of a rod formed with peripheral or radial spaced recesses 70 and 71 which co-act with the V-shaped detent 72 which is mounted on the reduced end of the stub rod 66. It will be observed that the recess 70 is not so deep as the recess 71 so that when the detent 72 engages the recess 70, the stub rod 66 is retracted against the resistance of the spring 67.

In this position the teeth 64 and 65 are disengaged and the stub rod is thus disengaged or axially spaced from the shaft 15 and the shaft is free to be rotated in either direction, that is clockwise or anti-clockwise. However when the push button 69 is moved longitudinally so that the detent 72 will engage the deeper recess 71, then the stub rod is projected forwardly by the spring 67 so that the serrations or teeth 64 and 65 engage, so that the shaft 15 will rotate only in a clockwise direction.

The thimble E is formed on its lower peripheral wall with a transversely disposed cylinder 73 which is closed at one end by a removable cover 74 which makes threaded engagement with the end of the cylinder and this cover is formed with a control bearing 75. The other end of the cylinder 73 is closed by a removable cover 76 which is threaded into the cylinder and is formed with a central bearing 77.

Rotatably mounted in the bearings 75 and 77 is a transversely extending shaft 78 which extends through the longitudinal axis of the cylinder, and on this shaft a gear 79 is rigidly mounted. This gear 79 extends through a peripheral opening between the cylinder and the thimble walls permitting the gear to mesh with the bronze worm 60 on the shaft 15. The ratio of the gear 79 to the worm 60 is one to four, that is for each revolution of the gear 79, the worm 60, and consequently the shaft 15 carrying the worm will be rotated four times.

One end of the shaft 78 projects outwardly beyond the bearing 77 in the cover 76 and is fitted with a crank handle 79a. It will be noted that the cover 74 and the cover 76 are interchangeable, so that by unscrewing both of these covers from the cylinder 73, then the crank handle 79a may be located to the right or the left side of the reel permitting the reel to be used by a right or left handed fisherman. In other words it is not necessary to construct specifically right and left handed reels, because my present spinning reel is designed to be used by both right and left handed anglers.

The thimble E is secured to the sleeve 16 by means of the screw 80 which makes threaded engagement with the orifice 81 in the peripheral wall of the thimble, and the inner end of the screw is reduced and engages the orifice 82 in the sleeve 16.

When the stub rod 66 is retracted to its outermost position by movement of the push button 69, then the serrations or teeth 65 are disengaged from the serrations or teeth 64 on the bronze worm 60, as will be seen in FIGURE 1, and the shaft 15 is then free to be rotated by the crank handle in either a clockwise or anti-clockwise direction.

My spinning reel is also provided with a T-shaped supporting arm 83 and the stem of this support is rigidly attached to the main body C of the reel casing B, and the transverse arm of the T is arcuate in cross section to facilitate positioning and clamping of the spinning reel on a fishing rod.

When my spinning reel is in use the fish line is attached to the spool 10 which constitutes a stator, and the line extends over the peripheral flange of the dished reel disc 34 which constitutes a rotor, and during the rotation of the reel disc or rotor in a clockwise direction the fish line is wound on the spool or stator 10.

Since the spool or stator 10 and the reel disc or rotor 34 are arranged in parallel planes one in front of the other, it will be clear that the rotation of the disc reel 34 evenly winds the fish line on the rear stepped wall 20 of the spool or stator 10.

Normally the pickup pin 50 will be in engagement with the line, and the line brake 58 will co-act with the pin to retain the line at proper tension during the winding and unwinding of the line on the spool 10. Should the angler desire to free the line from the pickup pin 50, then it is only necessary to press the push button end 25 of the spindle 24 inwardly, so moving the spindle into the bore 22 of the shaft 15 against the action of the spring 23.

This operation of the spindle 24 moves the conical cam 28 inwardly in sliding engagement with the arcuate inclined wall 54 of the cam slide 48, and thus the cam slide is moved inwardly and the pickup pin 50 is retracted through the orifice 51 in the peripheral flanged wall of the reel disc 34, and the cam slide 48 is momentarily held in this retracted position by the ball 45 engaging the recess 46 in the cam slide.

The line is released, but during the action of retracting the pickup pin 50 the rotation of the crank handle 79a is momentarily arrested, and as the angler subsequently continues to rotate the crank handle 79a, then rotary motion is transmitted through the gear 79 and the worm 60 to the shaft 15. The reel disc 34 is rotated and the pin 55 on the cam slide 48 engages the cam projection 57 so moving the cam slide 48 outwardly so that the pickup pin 50 is projected outwardly through the orifice 51 and, on further rotation of the reel disc 34, the pickup pin 50 reengages the line. In this position the ball 45 shall have engaged the recess 47 in the cam slide.

It will thus be seen that the repositioning of the pickup pin into its outward normal projected position is automatically controlled.

When an angler is playing a fish he may desire to put a drag on the fish, and to this end he may actuate the push button 69 and so control the rotation of the shaft 15 so that it may be rotated in a clockwise direction only, and the rotating of the hand crank 79a will wind the line in.

However the actuation of the push button 69 is at the discretion of the angler and will be used by him when it is found necessary or desirable.

Since the spool or stator 10 has its rear conical surface formed with a plurality of stepped tiers 20, then there is no possibility of the convolutions or windings of the line inadvertently slipping to impair the efficiency of the spinning reel. These stepped tiers 20 are concentrically formed on the rear conical surface of the spool 10, and are progressively arranged from the apex to the base of the spool, and the convolutions of the line on these stepped tiers may be readily observed by the angler through the windows in the reel casing when the spinning reel is in use.

The reel disc 34 rotates four complete revolutions for each revolution of the crank handle 79a so that the winding or unwinding of the line on or from the outer or larger stepped tiers of the stationary spool 10 is quick acting being about twenty four to twenty eight inches per revolution of the crank handle 79a.

From the above description it will be seen that I have invented a spinning reel in which the operating parts are enclosed in a casing, or within the confines of a casing, and in which a spool or stator is provided on which a line may be wound or unwound by a reel disc or rotor positioned axially in front of the stator and in parallelism therewith. The reel also provides for the pickup of the fishing line and the release of the line when deemed advisable, the release of the line being manually controlled and the pickup of the line being automatically controlled.

Further the several moving parts of the spinning reel are so arranged that lubrication is necessary at only infrequent intervals, usually about once annually. The spinning reel can be adapted with a minimum of adjustment from right to left hand operation. Further by the provision of windows in the rear casing the winding or unwinding of the line on the spool or rotor is at all times under the direct observation of the angler.

What I claim is:

1. A spinning reel comprising a casing; a non-rotatable sleeve in the casing; a spool rigidly mounted on the sleeve, said spool having a recess in the inner wall thereof, the peripheral wall of said recess forming a cam race and having an inwardly disposed cam projection; a shaft journalled in the sleeve and formed with a bore in one end; a reel disc mounted on the shaft in parallel spaced relation to the spool, said reel disc having a flanged peripheral wall; means for securing the reel disc to the shaft; a pair of parallel guide ribs on the inner face of the reel disc, said guide ribs disposed equi-distantly on opposite sides of the central aperture in the reel disc; a cam slide slidably mounted between said guide ribs, said cam slide having arcuate end walls and a generally elliptical central opening having an end portion bevelled rearwardly to form an inclined arcuate face; a pickup pin extending from an end wall of said cam slide and normally projecting beyond the peripheral wall of said reel disc; a pin projecting rearwardly from said cam slide at the end thereof opposite to said pickup pin; a spindle slidably mounted in the bore of said shaft; a frusto-conical cam member mounted on said spindle and movable therewith longitudinally of said bore, said cam member adapted to engage said inclined arcuate face of the cam slide upon longitudinal movement of said spindle into said bore thereby to move said cam slide between said guide ribs diametrically across the inner face of said reel disc to retract the pickup pin, said pin adapted upon retraction of the pickup pin to co-act with the cam projection on said cam race automatically to move said cam slide outwardly between said guide ribs thereby to return the pickup pin to its normally projected position upon rotation of said shaft; resilient means for returning the spindle to its normal position; means for transmitting rotary motion to the shaft; and means controlling the direction of rotation of the transmitting means.

2. A spinning reel as claimed in claim 1 including a series of spaced recesses formed in one of the lateral walls of said cam slide; a rib projecting laterally from one of said guide ribs; a cylindrical cavity formed in said lateral rib and extending through the adjacent guide rib into the guideway formed between said guide ribs; and a spring controlled ball mounted within said cavity, said ball adapted to co-act with the recesses formed in said cam slide releasably to hold said cam slide in a selected one of its retracted and projected positions.

3. A spinning reel comprising a casing; a non-rotatable sleeve in the casing; a spool rigidly mounted on the sleeve; a shaft journalled in the sleeve and formed with a bore in one end; a reel disc mounted on the shaft in parallel spaced relation to the spool, said reel disc having a flanged peripheral wall extending inwardly into the casing; means for securing the reel disc to the shaft; a pair of parallel guide ribs on the inner face of the reel disc, said guide ribs disposed equi-distantly on opposite sides of the axis of said reel disc; a cam slide slidably mounted between said guide ribs, said cam slide formed with a central opening having a portion thereof bevelled rearwardly to form an inclined arcuate face; a pickup pin extending from an end wall of said cam slide and normally projecting beyond the peripheral wall of said reel disc; a spindle slidably mounted in the bore of said shaft; a frusto-conical cam member mounted on said spindle and movable therewith longitudinally of said bore, said cam member adapted to engage the inclined arcuate face of said cam slide upon longitudinal movement of said spindle in said bore thereby to remove said cam slide inwardly between said guide ribs diametrically across the inner face of said reel disc to retract the pickup pin; means for automatically moving the cam slide to return the pickup pin to its normal projected position upon rotation of said shaft, said means consisting of a recess formed in the inner wall of said spool, the inner peripheral wall of said recess forming a cam race and having an inwardly disposed cam projection, and a pin projecting rearwardly from said cam slide at the end thereof opposite to said pickup pin, said pin adapted upon rotation of said shaft to engage said cam projection and move the cam slide outwardly through the guide ribs thereby to project the pickup pin beyond the periphery of the reel disc; means for transmitting rotary motion to the shaft; and means controlling the direction of rotation of the said transmitting means.

References Cited in the file of this patent
UNITED STATES PATENTS

| | | |
|---|---|---|
| 2,492,587 | Ledingham | Dec. 27, 1949 |
| 2,507,457 | Rix | May 9, 1950 |
| 2,711,292 | Taggart et al. | June 21, 1955 |
| 2,828,927 | Yeada | Apr. 1, 1958 |
| 2,852,205 | Beger | Sept. 16, 1958 |
| 2,863,616 | Hutchison et al. | Dec. 9, 1958 |
| 2,911,165 | Sarah | Nov. 3, 1959 |
| 2,915,258 | Hull | Dec. 1, 1959 |